United States Patent Office 3,642,698
Patented Feb. 15, 1972

3,642,698
EPOXY RESIN CURING WITH IMIDAZOLE ALKYL ACID PHOSPHATE SALT CATALYST
Harold A. Green, Havertown, Pa., assignor to Air Products and Chemicals, Inc., Philadelphia, Pa.
No Drawing. Continuation-in-part of abandoned application Ser. No. 662,593, Aug. 23, 1967. This application May 15, 1970, Ser. No. 37,921
Int. Cl. C08g 30/14
U.S. Cl. 260—47                                     11 Claims

ABSTRACT OF THE DISCLOSURE

Polyepoxide resin curing is effected with a curing agent comprising the salt of an imidazole and an alkyl acid phosphate. Such a curing agent in the presence of curable resin exhibits excellent shelf-life characteristics and responds favorably at elevated temperature curing conditions to yield high quality cured resin product.

REFERENCE TO RELATED APPLICATIONS

This application is a continuation-in-part of application Ser. No. 662,593, filed Aug. 23, 1967 and now abandoned. Also related is copending application Ser. No. 37,853 filed May 15, 1970 which is a divisional continuation-in-part of application Ser. No. 662,593 filed Aug. 23, 1967.

BACKGROUND OF THE INVENTION

The present invention relates to the curing of epoxy resins. More particularly, the present invention relates to the delayed (elevated temperature) curing of epoxy resins using the alkyl acid phosphate salt of certain imidazoles and to latent curing formulations comprising an epoxy resin and an imidazole alkyl acid phosphate salt.

In recent years epoxy resins, i.e., the resinous or resin-forming materials which contain one or more epoxide or oxirane group, have come into broad commercial use. While glycidyl ether resins, produced by reacting polyhydroxyl compounds with epichlorohydrin, have been the most prominent members designated by the expression "epoxy resin," significant development has occurred in the utilization of epoxidized olefins, which are formed by the addition of oxygen to the double bond to form the three-membered epoxide ring.

Epoxy resins are particularly valued for their ability to remain liquid for a long period of time while being readily convertible upon hardening to materials suitable for use in such applications as filament windings, laminates, electrical insulations, coatings and adhesives. This hardening is obtained by the addition of chemically active curing or hardening agents. Two general types of reactions are involved in producing useful end products: (1) cross-linking or coupling reactions, including esterification and etherification; and (2) catalytic polymerization reactions which occur predominantly by polymerization through the epoxy groups.

Many conventional epoxy curing agent systems have certain disadvantages that limit their industrial use. For example, known mixtures comprising polyepoxides and aliphatic amines set up rather rapidly necessitating admixture of the components just before use and rapid utilization of the material before hardening occurs. Such a procedure places a considerable burden on the individual user, and in many instances gives inferior products because of insufficient mixing and the rapidity of the curing.

In an increasing number of applications involving epoxy resins, delayed curing of the resin-curing agent mixture is desired, i.e., the ability to store mixtures of epoxy resins and curing agent for extended periods of time and then cure the mixture at moderately elevated temperatures to products having good physical properties. Delayed curing is also needed in pre-preg applications, viz., applications in which the resin-curing agent mixture is impregnated into the reinforcement medium, such as glass fiber or cloth, and then stored for periods of up to six months prior to use in the preparation of reinforced composites.

Efforts directed to the provision of curing agents having delayed curing properties in the resin-curing agent mixture have met with some measure of success. It is reported in the literature that certain imidazole compounds are curing agents which have a relatively good pot life, i.e., delayed curing properties; and are curable in epoxy mixtures at moderate temperatures, as at 50° C. and above. It is reported also that orthophosphoric acid or monoalkyl orthophosphate are curing agents having a degree of pot life as of up to several days time. Such available curing agents however do promote curing of their mixtures with epoxy resins even at room temperature conditions so that an effective pot life of more than a day or two is generally the practical limit.

SUMMARY OF THE INVENTION

It has now been discovered that delayed or latent curing of epoxy resins can be effectively accomplished using a curing agent comprising the alkyl acid phosphate salt of an imidazole having the following formula:

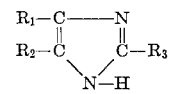

wherein $R_1$, $R_2$ and $R_3$ are independently selected from hydrogen, alkyl radicals of 1 to 19 carbon atoms, aryl hydrocarbon radicals of 6 to 14 carbon atoms and aralkyl hydrocarbon radicals of 7 to 16 carbon atoms. The alkyl acid phosphates are those having at least one acidic OH bonded to the phosphorus atom in the molecule and the longest alkyl group in the molecule has no more than 4 carbon atoms. The alkyl acid phosphate salt of such an imidazole, prepared by reacting at least one mol of alkyl acid phosphate per mol of the imidazole at a temperature between 23 and 100° C., not only provides a curing catalyst but also provides such a catalyst characterized in its ability to be associated with curable epoxy resins at normal ambient storage conditions for time periods of weeks running into months as well as promoting readily thermal cure at moderately elevated temperatures, and providing mechanical properties of the resulting cured products equal to or better than the properties obtained using the particular imidazole or alkyl acid phosphate as the sole curing agent.

Insoluble, infusible products are obtained by heating the poly-epoxide-imidazole alkyl acid phosphate mixture to a temperature between 120 and 300° C. and preferably between 150 and 300° C. for ten minutes to six hours.

In addition to the fact that low required use concentrations of an imidazole alkyl acid phosphate, in the range of 0.1 to 25 parts by weight per 100 parts by weight of the epoxy resin, provide excellent properties at minimum applied costs, an imidazole alkyl acid phosphate has extremely desirable handling characteristics, including:

(a) Ease of compounding.—Unlike solid aromatic amines, such as diaminodiphenyl sulfone and dicyandiamide, and some anhydrides used in epoxy curing, the imidazole alkyl acid phosphate in a liquid state eliminates the need of solvents involving toxicity and flammability hazards as well as continued heating at elevated temperatures to maintain a uniform resin mixture.

(b) Extended pot life.—The improved pot life obtainable with an imidazole alkyl acid phosphate in a conventional liquid epoxy resin system is outstanding.

(c) Low viscosity.—The low initial viscosity and the relatively low rate of change of viscosity with time of imidazole alkyl acid phosphate systems makes such systems particularly attractive for use in filament winding applications. Improved wetting out during laminate preparation is directly attributable to the lower viscosity of imidazole alkyl acid phosphate resin blends. Higher filler loadings and many casting applications are also made possible.

(d) Low volatility.—The low volatility of imidazole alkyl acid phosphate provides lower weight loss epoxy systems than most available curing agents.

DESCRIPTION OF PREFERRED EMBODIMENTS

Examples of imidazole compounds suitable for use in the process of the present invention include, among others, 2-methyl imidazole, 2-ethylimidazole, 2-ethyl-4-methyl imidazole, 4-butyl-5-ethyl imidazole, 2-dodecyl-5-methyl imidazole, 2,4,5-trimethyl imidazole, 2-cyclohexyl-4-methyl imidazole, 2-butoxy-4-allyl imidazole, 2-carbo-ethoxy butyl-4-methyl imidazole, 2-octyl-4-hexyl imidazole, 2-ethyl-4-phenyl imidazole, 2,5-diphenyl imidazole, 2-benzyl imidazole, 2-phenethyl imidazole, and mixtures thereof.

The alkyl acid phosphates suitable for use in the process of the present invention are those in which the alkyl group is any one of the methyl through the butyl hydrocarbon radical, those in which the phosphate moiety has two alkyl groups of which both may be the methyl through the butyl groups or where one of which two groups may be an alkyl group dissimilar from the other but neither of which has more than 4 carbon atoms in the group. Preferred alkyl acid phosphate salts include methyl or dimethyl acid phosphate, ethyl acid phosphate, propyl acid phosphate and butyl acid phosphate.

The polyepoxides which can be used in the present invention are those compounds possessing on the average more than one epoxy or oxirane group per molecule. The number of epoxy groups contained in the average molecule is obtained by dividing the average molecular weight of the polyepoxide by the epoxide equivalent weight. The polyepoxides can be saturated or unsaturated, aliphatic, aromatic, or heterocyclic, monomeric or polymeric and, if desired, can be substituted with non-interfering substituents such as halogen atoms, hydroxyl groups and ether radicals.

Preferred polyepoxy compounds are glycidyl ethers of polyhydric phenols, such as diphenylolalkanes—e.g. diphenylolpropane, diphenylolethane and diphenylolmethane, diphenylol sulphone, hydroquinone, resorcinol, dihydroxydiphenyl, dihydroxynaphthalenes, and polyhydric phenols, such as novolacs, and resols, which have been prepared by condensation of phenol and formaldehyde.

Glycidyl ethers of polyhydric phenols can be prepared in various ways, for example, by reaction of the polyhydric phenol with epichlorohydrin in the presence of a base, such as sodium hydroxide or potassium hydroxide. Important polyepoxy compounds are the glycidyl ethers of 2,2-bis(4-hydroxy-phenyl)propane. The molecular weight, as well as the softening point and viscosity, of such compounds generally depends on the ratio of epichlorohydrin to 2,2-bis(4-hydroxyphenyl)propane. If a large excess of epichlorohydrin is used, e.g., 10 molecules of epichlorohydrin per molecule of 2,2-bis(4-hydroxyphenyl)propane, the main component in the reaction product is a glycidyl ether of low molecular weight. The polyethers may in some cases contain small amounts of material with a terminal glycidyl radical is hydrated form. Glycidyl polyethers of 2,2-bis(4-hydroxyphenyl)propane having a molecular weight between 340 and 4000 are preferred.

Other suitable polyepoxy compounds are poly(epoxyalkyl)ethers of aliphatic polyhydroxy compounds such as ethylene glycol, glycerol and trimethylolpropane; poly(epoxyalkyl)esters of polycarboxylic acids, such as the diglycidyl esters of phthalic acid, terephthalic acid and adipic acid, and polyglycidyl esters of polymer unsaturated fatty acids, such as diglycidyl ester of dimerized linoleic acid; epoxidized esters of unsaturated acids, such as epoxidized linseed oil or soyabean oil; epoxidized dienes, such as diepoxybutane and epoxidized vinyl-cyclohexane; and di(epoxyalkyl)ethers in which two epoxyalkyl groups are connected by only one oxygen atom, such as diglycidyl ether.

The polyepoxide and the alkyl acid phosphate salt of the imidazole compound can be combined in a wide range of proportions. For example, the imidazole compound can be employed in amounts varying from about 0.1% to 25% by weight of the polyepoxide and is preferably employed in an amount varying from 1 to 10% by weight of the polypoxide.

Various additives can be included in the polyepoxide-imidazole alkyl acid phosphate mixture before cure, such as solvents, diluents, pigments, fillers, fibrous materials, dyes, resins, plasticizers and non-volatile extenders. If the polyepoxide is a viscous liquid or a solid, mixing can be accomplished simply by moderate heating. While the addition of a solvent, such as benzene, toluene, cyclohexane, ketones, ethers, esters, nitriles, etc., can be used, the use of a solvent is generally not required and is not desirable. Monoepoxy diluents, such as butyl glycidyl ether, phenyl glycidyl ether, and monoglycidyl esters can also be employed. These diluents take part in the curing reaction, and can be used in amounts of up to 20% by weight of the polyepoxide. Typical non-reactive, non-volatile extenders include coal tars, refined coal tars, coal tar pitches, asphalts, pine tar, pine oil, lube oil fractions and aromatic extracts thereof, and lube oil raffinates.

The resinified products obtained by the above-identified process of this invention have surprisingly high flexural strength and excellent retention of such strength after exposure to elevated temperature. These desirable characteristics are demonstrated by measurements made after exposure of the resinified products to dry heat or after extended immersion in boiling water. Coupled with the other desirable attributes of resin products of this type, such as solvent resistance and dimensional stability, highly useful materials are provided. These desirable properties make the process of particular value in the preparation of laminated articles and in filament winding applications.

The process of the invention is particularly useful for filament winding applications. In these applications, the filaments, such as, for example, glass fibers, are passed into and through liquid mixtures of the invention, wound onto the desired mandrel or form and then cured with the application of heat. In view of the delayed curing property of the composition of the present invention, the bath through which the filaments are passed can be maintained hot for good wet-out. Since curing is effected at moderately elevated temperatures, this curing can occur in close proximity with heat sensitive materials.

The process of the invention is also particularly useful for encapsulation of electrical and other types of equipment. In many cases it is important to hold such apparatus or equipment in rigid position so that the tubes or other delicate pieces will not be jarred out of position. In such operations, the desired mixture of polyepoxide and an imidazole alkyl acid phosphate is poured into a mold which surrounds the electrical apparatus. By elevating the temperature, the composition sets up to a hard cured casting and the encapsulated apparatus can be removed from the mold.

The process of the invention is also useful for adhesives. In this application a mixture of polyepoxide and an imidazole alkyl acid phosphate can be combined with pigments, plasticizers, stabilizers and reinforcing fillers, such as aluminum powder, asbestos, powdered mica, zinc dust, bentonite, ground glass fibers and clay. These fillers are preferably used in amounts varying from 10 parts to 200 parts per 100 parts of the polyepoxide-curing agent mixture.

Other materials that may be included comprise various resins such as phenol-aldehyde resins, urea-aldehyde resins, furfural resins, polyacetal resins, polycarbonate resins, polyamide resins and silicon resins.

The process of the invention is also useful for preparing laminates. In preparing laminates, sheets of fibrous material are first treated with a mixture of polyepoxide and an imidazole alkyl acid phosphate. This is conveniently accomplished by spreading the mixture onto sheets of glass cloth, paper, textiles, etc. The sheets are then superimposed and the assembly cured under heat and pressure. Preferably, curing is accomplished using a heated press maintained at a pressure of up to 500 p.s.i.g. or higher and a temperature of 100 to 300° C.

Fibrous material which can be used in the preparation of the laminates includes such materials as glass cloth and matting, boron fibers, paper, asbestos paper, mica flakes, cotton batts, duck muslin, canvas and synthetic fibers such as nylons and polyethylene terephthalate. It is usually preferred to utilize woven glass cloth that has been given prior treatment with well known finishing or sizing agents such as chrome methacrylate or vinyltrichlorosilane.

The invention will be illustrated by the following specific examples, it being understood that there is no intention to be necessarily limited by any details thereof since variations can be made within the scope of the invention.

Example I 100 parts by weight of Epon 828, an epoxy resin prepared by reacting epichlorohydrin and bis-phenol A having an epoxide equivalent weight of 180–200 and a viscosity of 100–200 poises (25° C.), was mixed with two parts by weight of 2-ethyl-4-methyl imidazole methyl acid phosphate. The mixture having a viscosity of 55 cps. was then heated to 90° C. and maintained at this temperature for 8 hours and 15 minutes at which time the viscosity of the mixture was 890 cps. at 23° C. The epoxy-2-ethyl-4-methyl imidazole methyl acid phosphate formulation was then cured by heating it to 150° C. for 10 minutes.

The fact that the epoxy-2-ethyl-4-methyl imidazole methyl acid phosphate formulation can be heated to about 90° C. without excessive viscosity change over an extended time period demonstrates a highly desirable processing advantage of this formulation for filament winding applications which require long processing times and viscosities below 1000 cps.

Heating of an epoxy resin-curing agent mixture at about 90° C. is a procedure providing an accelerated test of such a mixture's propensity to cure at the ambient conditions of usual storage, referred to usually as "pot life." Systems with a brief pot life, even up to that of several days, will cure or gel at this temperature level in 5 hours or less whereas a system which does not gel over 6 to 8 hours may be considered as having a pot life of over a week, such as for a month or more. It is to be understood that such a test to be fully meaningful requires that systems having the ability to retain their non-gelling characteristics over the 6–8 hours heating at 90° C. to be successful must have the ability to cure when submitted to reasonable curing conditions.

Example II

A pre-preg composite was prepared by treating glass fibers (i.e., 1062 T–15 fiberglass roving from Pittsburgh Plate Glass) with a formulation comprising 100 parts by weight of Epon 826, an epoxy resin prepared by reacting epichlorohydrin and bis-phenol A having an epoxide equivalent weight of 180 to 188 and a viscosity of 65 to 95 poises (25° C.), and 2 parts by weight of 2-ethyl-4-methyl imidazole methyl acid phosphate by passing the glass fibers into and through the epoxy resin-curing agent mixture.

The pre-preg material was then stored at 5° C. for 41 days. Naval Ordnance Laboratory (NOL) rings prepared from the stored pre-preg material had a tensile strength of 58,800 p.s.i. (as determined by the split disc method—ASTM D 2290).

Example III

Tests were made to determine the effect of heat aging and boiling water on laminates prepared with 12 plies of 181 style glass fiber cloth treated with a methacrylate-chrome finish (Du Pont Volan "A"). The glass fiber cloth was treated with the following three formulations at a resin pickup of 50% by weight:

(a) 100 parts by weight of Epon 826 and 7 phr. of 2-ethyl-4-methyl imidazole methyl acid phosphate
(b) 100 parts by weight of Epon 826 and 3 phr. of $BF_3$ monoethylamine
(c) 100 parts by weight of Epon 826 and 4 phr. of dicyandiamide.

Laminates were then prepared at a pressure of 100 pounds per square inch for 30 minutes at 175° C. Post-curing was effected for 30 minutes at 204° C. The flexural modulus and flexural strength (ASTM D 790) for the three laminates at 23° C., after 2 hours in boiling water and at 23° C. after 30 minutes at 260° C. are shown in the following table:

| Treatment | Formulation | Flexural strength (p.s.i.) | Flexural modulus (p.s.i.) |
|---|---|---|---|
| At 23° C. | (a) | 73,000 | $31 \times 10^5$ |
|  | (b) | 85,000 | $35 \times 10^5$ |
|  | (c) | 98,100 | $35 \times 10^5$ |
| At 23° C. after 2 hours in boiling water. | (a) | 51,400 | $27 \times 10^5$ |
|  | (b) | 37,800 | $27 \times 10^5$ |
|  | (c) | 62,800 | $24 \times 10^5$ |
| At 23° C. after 30 minutes at 260° C. | (a) | 76,300 | $30 \times 10^5$ |
|  | (b) | 51,400 | $32 \times 10^5$ |
|  | (c) | 66,000 | $26 \times 10^4$ |

As seen in the above table, laminate treated with epoxy resin-2-ethyl-4-methyl imidazole methyl acid phosphate formulation retains good mechanical properties. However, laminates treated with formulations (b) and (c), show a considerable loss of mechanical properties after 30-minute exposure at 260° C.

Example IV 100 parts by weight of a polyglycidyl ether of 2,2-bis (4-hydroxy-phenyl)propane having an epoxy equivalent of 200, a molecular weight of 380 and a viscosity of 150 poises at 25° C., is combined with 10 parts by weight of 2 phenyl imidazole ethyl acid phosphate and the mixture is stored at 60° C. for 20 hours.

The stored mixture is then cured by heating to 120° C. for 1 hour. The resulting product is a hard, insoluble, infusible material having an excellent heat distortion temperature (HDT) and excellent hardness.

Example V 100 parts by weight of the diglycidyl ether of resorcinol is combined with 15 parts by weight of 2-benzyl-4-methyl imidazole methyl acid phosphate and the resulting mixture is stored for 50 days at room temperature.

A hard, insoluble, infusible product having an HDT of above 149° C. (ASTM D 648-56) is obtained by subsequent curing at 120° C. followed by a 149° C. post-cure.

Example VI 100 parts by weight of a glycidyl ether of a novolac resin, obtained by reacting a phenol-formaldehyde condensate with epichlorohydrin, is mixed with 18 parts of 2-methyl imidazole methyl acid phosphate. The mixture is stored for 48 hours at 70° C. without curing.

A hard, insoluble, infusible product is then obtained by heating the stored mixture to a temperature of 130° C. for 45 minutes.

Example VII

A pre-preg composite was prepared by treating glass fibers (i.e., 1062 T–15 fiberglass roving from Pittsburgh Plate Glass) with a formulation comprising 100 parts by weight of Epon 826, an epoxy resin prepared by reacting epichlorohydrin and bis-phenol A having an epoxide equivalent weight of 180 to 188 and a viscosity of 65 to 95 poises (25° C.), and 2 parts by weight of 2-ethyl-4-methyl imidazole n-butyl acid phosphate by passing the glass fibers into and through the epoxy resin-curing agent mixture.

The pre-preg material was then stored at 5° C. for 41 days. Naval Ordnance Laboratory (NOL) rings prepared from the stored pre-preg material had a tensile strength of 68,350 p.s.i. (as determined by the split disc method—ASTM D 2290).

Example VIII

The dimethyl acid phosphate [2(CH$_3$O)$_2$PO$_2$H] was prepared by reacting P$_2$O$_5$ with methanol. A glass vessel provided with stirring means and reflux provisions was charged with 4 mols of methanol dissolved in 200 grams of toluene. To this was added in small increments, 1 mol of P$_2$O$_5$ suspended in toluene. During the addition agitation was continued and the temperature in the reaction vessel was held at about 60–65° C. After all of the P$_2$O$_5$ suspension was added and reaction ceased, as indicated by cessation of an exotherm, the product was recovered by separation from the toluene and water. The product, dimethyl ester of phosphoric acid, had an observed specific gravity by hydrometer of 1.330 (literature value given as 1.335) and an RI (measured) of 1.410 (the literature value is 1.408).

The salt of the dimethyl acid phosphate was prepared by admixing 12.6 grams of the above product and 11.0 grams of 2-ethyl-4-methyl imidazole.

100 parts by weight of Epon 828 was mixed with 2 parts by weight of the 2-ethyl-4-methyl imidazole dimethyl acid phosphate. The mixture having a viscosity of 10,700 cps. was then heated to 90° C. and maintained at this temperature for 9 hours. After this heating period the viscosity was again determined and found to be substantially unchanged. The epoxy-2-ethyl-4-methyl imidazole dimethyl acid phosphate formulation was thereafter placed in a mold and subjected to curing at a temperature of 140° C. for 1 hour. The cured product had the configuration of the mold and was an insoluble, infusible material having an excellent HDT and excellent hardness.

Example IX

In a comparative test three separate epoxy resin-curing agent mixtures were prepared. Mixture A, in accordance with this invention, was prepared by admixing 100 parts by weight of Epon 828 and the salt of 2-ethyl-4-methyl imidazole and dimethyl acid phosphate in an amount of 2 parts per 100 parts of resin. Mixture B was prepared by admixing 100 parts by weight of Epon 828 and 2-ethyl-4-methyl imidazole in an amount of 2 parts per 100 parts of resin. Mixture C was prepared by admixing 100 parts by weight of Epon 828 and monobutylorthophosphate in an amount of 2 parts per 100 parts of resin.

Each of mixtures A, B and C were heated at 90° C. Admixture B gelled to a hard mass after only 1½ hours at 90° C. and thus exhibited by this test a relatively short pot life. Both admixtures A and C were still liquid after heating for 8 hours at 90° C. Thereafter mixtures A and C were heated at 175° C. Admixture A (prepared in accordance with this invention) cured in 2½ hours to a hard, insoluble, infusible material having excellent HDT characteristics. Mixture C was still uncured, i.e., non-gelled fluid, after 24 hours heating at 175° C.

Further tests were made in which Admixture D was prepared for comparison with a duplication of Admixture A. Admixture D was prepared by combining 100 parts by weight of Epon 828, 2-ethyl-4-methyl imidazole in an amount of 1 part by weight per 100 parts by weight of resin, and orthophosphoric acid (87% in water) in an amount of 1 part by weight per 100 parts by weight of resin. Admixture D was heated to 90° C. for 30 minutes and formed some gelatinous particles or masses randomly distributed throughout the matrix and accumulating along the bottom of the liquid. Little change in condition occurred during further heating at 90° C. for a total of 9 hours. Subsequent treatment at 179° C. for 90 minutes failed to effect a cure of Admixture D; whereas similar treatment, both at 90° C. for 9 hours which effected no cure and subsequent treatment at 179° C. for 90 minutes resulted in a cure of the duplicate of Admixture A, giving a product of excellent hardness, insolubility and high HDT value. Other tests demonstrate the monoalkyl acid phosphate salts of imidazole have the beneficial and desirable characteristics above demonstrated with the dialkyl compounds and are superior to the previously available described curing agents.

Thus, delayed or latent curing of epoxy resins is accomplished in accordance with the present process without sacrificing mechanical properties by employing an imidazole alkyl acid phosphate as a curing agent.

What is claimed is:

1. A method for curing polyepoxides and compositions thereof in which the polyepoxide has on the average more than one 1,2-epoxy group per molecule which comprises admixing said polyepoxide with the alkyl acid phosphate salt formed from (A) an imidazole having the formula

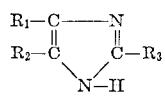

wherein R$_1$, R$_2$ and R$_3$ are independently selected from the group consisting of hydrogen, alkyl radicals of 1 to 19 carbon atoms, aryl hydrocarbon radicals of 6 to 14 carbon atoms and aralkyl hydrocarbon radicals of 7 to 16 carbon atoms and (B) an alkyl acid phosphate having at least one acid OH bonded to the phosphorus atom in the molecule and in which the longest alkyl group in the molecule has no more than 4 carbon atoms, said alkyl acid phosphate salt being employed in an amount of between 0.1 and 25% by weight of the polyepoxide and thereafter curing said mixture at a temperature of between 120° and 300° C.

2. The method of claim 1 wherein the alkyl acid phosphate salt of the imidazole is employed in an amount of between 1 and 10% by weight of the polyepoxide.

3. The method of claim 1 wherein the alkyl group of the alkyl acid phosphate salt of an imidazole contains from 1 to 4 carbon atoms.

4. The method of claim 3 wherein the alkyl acid phosphate salt of an imidazole is the methyl acid phosphate salt of 2-ethyl-4-methyl imidazole.

5. The method of claim 3 wherein the alkyl acid phosphate salt of an imidazole is the butyl acid phosphate salt of 2-ethyl-4-methyl imidazole.

6. The method of claim 1 wherein the alkyl acid phosphate has at least one OH bonded to the phosphorus atom in the molecule and no more than two alkyl groups having no more than 4 carbon atoms in any such group.

7. The method of claim 1 wherein the alkyl acid phosphate is the dimethyl ester of phosphoric acid.

8. The composition comprising a polyepoxide having on the average more than one 1,2-epoxy group per molecule and the salt of an imidazole having the formula

wherein $R_1$, $R_2$ and $R_3$ are independently selected from the group consisting of hydrogen, alkyl radicals of 1 to 19 carbon atoms, aryl hydrocarbon radicals of 6 to 14 carbon atoms and aralkyl hydrocarbon radicals of 7 to 16 carbon atoms and an alkyl acid phosphate having at least one acid OH bonded to the phosphorus atom in the molecule and no more than two alkyl groups having no more than 4 carbon atoms in any such group; said salt being present in the amount of 0.1 to 20% by weight of the polyepoxide.

9. The composition in accordance with claim 8 wherein said salt is imidazole dialkyl acid phosphate.

10. The composition in accordance with claim 8 wherein said salt is monoalkyl acid phosphate.

11. The composition in accordance with claim 8 wherein said imidazole is 2-ethyl-4-methyl imidazole and said alkyl acid phosphate is methyl acid phosphate.

References Cited

UNITED STATES PATENTS

| 2,541,027 | 2/1951 | Bradley | 260—2 |
| 3,438,937 | 4/1969 | Christie | 260—18 |
| 3,013,049 | 12/1961 | Holtschmidt | 260—47 |

OTHER REFERENCES

Imidazoles, by Hoffman, December 1953 (pp. 45, 46), Intersc. Pub. Inc.

WILLIAM H. SHORT, Primary Examiner

T. E. PERTILLA, Assistant Examiner

U.S. Cl. X.R.

117—124, 161; 161—184, 185; 260—2, 18, 28, 29.1, 37, 830, 831, 59